United States Patent
Seibold et al.

(10) Patent No.: US 8,870,293 B2
(45) Date of Patent: Oct. 28, 2014

(54) ONE-PIECE SEAT BACK FRAME ASSEMBLY AND METHOD OF MAKING SAME

(75) Inventors: Kurt A. Seibold, Whitmore Lake, MI (US); Ornela Zekavica, Novi, MI (US); Youzhi Xiong, Northville, MI (US); Catherine M. Amodeo, Livonia, MI (US); Phillip Wayne Wilson, Wixom, MI (US)

(73) Assignee: Johnson Controls Technology Company, Holland, MI (US)

( * ) Notice: Subject to any disclaimer, the term of this patent is extended or adjusted under 35 U.S.C. 154(b) by 277 days.

(21) Appl. No.: 13/509,417

(22) PCT Filed: Nov. 12, 2010

(86) PCT No.: PCT/US2010/056451
§ 371 (c)(1), (2), (4) Date: Aug. 20, 2012

(87) PCT Pub. No.: WO2011/060219
PCT Pub. Date: May 19, 2011

(65) Prior Publication Data
US 2012/0306253 A1 Dec. 6, 2012

Related U.S. Application Data

(60) Provisional application No. 61/260,675, filed on Nov. 12, 2009.

(51) Int. Cl.
*A47C 7/02* (2006.01)
*B60N 2/68* (2006.01)

(52) U.S. Cl.
CPC *B60N 2/68* (2013.01); *B60N 2/686* (2013.01); *B60N 2/682* (2013.01)
USPC ............... 297/452.18; 297/452.2; 297/452.19

(58) Field of Classification Search
USPC .............................. 297/452.18, 452.2, 452.19
See application file for complete search history.

(56) References Cited

U.S. PATENT DOCUMENTS 5,308,294 A  5/1994 Wittig et al.
5,499,863 A * 3/1996 Nakane et al. ............. 297/452.2
(Continued)

FOREIGN PATENT DOCUMENTS

JP  2000-270961  10/2000
JP  2003-182417  7/2003
(Continued)

OTHER PUBLICATIONS

English language translation of "Notice of Reasons for Rejection" from the Japanese Patent Office, dated Oct. 15, 2013.

(Continued)

*Primary Examiner* — Chi Q Nguyen
(74) *Attorney, Agent, or Firm* — Butzel Long

(57) ABSTRACT

A one-piece seat back frame for use in a vehicle seat assembly. The one-piece seat back frame includes a first side portion and a second side portion spaced apart from the first side portion, an upper cross portion and a lower cross portion. A lower cross bracket member is coupled to the seat back frame such that the lower cross bracket member at least partially overlaps the seat back frame lower cross portion forming a boxed section. A first recliner mechanism is coupled to the second end of the lower cross bracket member for a single-sided recliner system. A pivot bracket or a second recliner mechanism is coupled to the first end of the lower cross bracket member for a dual-sided recliner system.

16 Claims, 14 Drawing Sheets

(56) References Cited

U.S. PATENT DOCUMENTS

| | | | |
|---|---|---|---|
| 5,509,716 A | | 4/1996 | Kolena et al. |
| 5,697,670 A | * | 12/1997 | Husted et al. ............ 297/216.13 |
| 5,749,624 A | * | 5/1998 | Yoshida .................... 297/367 R |
| 5,810,466 A | * | 9/1998 | Young ........................... 362/102 |
| 6,045,186 A | * | 4/2000 | Butt et al. ..................... 297/296 |
| 6,767,067 B2 | * | 7/2004 | Fourrey et al. ............ 297/452.18 |
| 7,677,669 B2 | * | 3/2010 | Blankart .................. 297/452.18 |
| 8,539,661 B2 | * | 9/2013 | Gross et al. ..................... 29/428 |
| 8,550,563 B2 | * | 10/2013 | Nasshan et al. .......... 297/452.18 |
| 2005/0168042 A1 | | 8/2005 | Williamson et al. |
| 2005/0269856 A1 | * | 12/2005 | Kim ........................ 297/452.18 |
| 2008/0129097 A1 | | 6/2008 | Kowal et al. |
| 2013/0119743 A1 | * | 5/2013 | Evans et al. .............. 297/452.18 |
| 2013/0328375 A1 | * | 12/2013 | Zekavica et al. ......... 297/452.18 |

FOREIGN PATENT DOCUMENTS

| | | |
|---|---|---|
| JP | 2004-189137 | 7/2004 |
| JP | 2006-248415 | 9/2006 |

OTHER PUBLICATIONS

Patent Abstract of Japan Publication No. 2004-189137, date of publication of application: Jul. 8, 2004.

Patent Abstract of Japan Publication No. 2000-270961, date of publication of application: Oct. 3, 2000.

Patent Abstract of Japan Publication No. 2006-248415, date of publication of application: Sep. 21, 2006.

Patent Abstract of Japan Publication No. 2003-182417, date of publication of application: Jul. 3, 2003.

* cited by examiner

ONE-PIECE SEAT BACK FRAME ASSEMBLY AND METHOD OF MAKING SAME

CROSS REFERENCE TO RELATED APPLICATIONS

This application claims the benefit of and priority to U.S. Provisional Application No. 61/260,675, filed Nov. 12, 2009, which is incorporated herein by reference.

BACKGROUND

The present disclosure relates generally to the field of seating for vehicles and more particularly, to a one-piece seat back frame assembly and method of making same.

DESCRIPTION OF THE RELATED ART

Seat structures, such as, seat back frames, seat base cushion frames, low seat structures, and back frame seat belt towers can provide strength to a seat assembly to meet strength and/or durability requirements. These requirements are commonly covered by governmental regulations, such as, FMVSS and ECE or dictated by other groups, such as, by vehicle manufacturers and insurance groups. Seat structures can also be configured to meet the desires of customers (and hence vehicle manufacturers) for seat assemblies that provide increased functionality or utility, such as, rotating, folding, and sliding, while improving user-adjustable comfort. Achieving the desired strength, durability, stiffness, functional, and utility characteristics typically requires the use of additional components which can have an undesirable impact on mass, cost, and comfort. Therefore, seat structures are typically designed by balancing structural and functional characteristics against mass, comfort, and cost.

It is generally known to construct a seat structure by separately forming individual members through a conventional stamping process, such as by a multiple station progressive stamping die and then coupling those formed members through a process, such as, a laser welding process, a GMAW process, etc. This method of construction has several disadvantages, at least some of which are as follows. First, the welding process for joining formed components, especially laser welding, requires tight tolerances with respect to parameters, such as gaps, to produce a reliable structural weld which can require complex and expensive fixtures or tooling during the manufacturing cycle. Second, concerns about reduced reliability resulting from the tight tolerances may cause manufacturers to couple the members with redundant welds to increase reliability which can add to piece cost and cycle time of manufacture. Third, individual stamping dies or tooling may be required to produce each individual member which can add to piece cost and maintenance cost. Fourth, a higher number of individual members used to construct a seat structure results in a higher likelihood that the lack of one member will stop the entire production process of a seat structure. Fifth, this method of construction requires significant part handling downstream in the manufacture process which can add to the piece cost. Sixth, this method of construction can inhibit optimization of mass and strength because the desire to reduce costs by having as few parts as possible in the assembly can cause manufacturers to structurally overdesign portions of the seat structure to achieve part reduction. Seventh, some conventional methods of coupling, such as GMAW and fasteners, require overlaps and/or the addition of material, such as extra parts or filler material, which negatively impacts mass and cost. Eighth, the coupling of multiple individual stamped members typically requires a significant number of welds. For example, a conventional four member back frame structure may require more than twenty welds to couple the members into one assembly. The need for this high quantity of welds in combination with conventional weld fixtures, such as a rotating carousel fixture, result in slow manufacturing cycle times.

Accordingly, there is a need to design and form structural components with reduced mass and reduced cost while meeting or exceeding increased strength and durability requirements. Additionally, because the structural components of a seat assembly of a vehicle provide safety related functionality, there is always a need to increase reliability of the processes and components that are in the load path during a dynamic vehicle impact event. There also is a need for additional functionality with a minimal impact on comfort, mass, and cost. Additionally, the cost to handle or modify the component increases significantly as a product moves downstream in its manufacturing cycle, hence there is a desire to reduce or eliminate downstream operations.

SUMMARY

Accordingly, the present disclosure relates to a one-piece seat back frame for use in a vehicle seat assembly. The one-piece seat back frame includes a first side portion and a second side portion spaced apart from the first side portion, an upper cross portion and a lower cross portion. A lower cross bracket member is coupled to the seat back frame such that the lower cross bracket member at least partially overlaps the seat back frame lower cross portion forming a boxed section. A first recliner mechanism is coupled to the second end of the lower cross bracket member for a single-sided recliner system. A pivot bracket or a second recliner mechanism can be coupled to the first end of the lower cross bracket member for a dual-sided recliner system Also provided is a one-piece seat back frame for use in a vehicle seat assembly including a first side portion and a second side portion spaced apart from the first side portion, an upper cross portion and a lower cross portion. An upper cross bracket member including a first channel having a first head restraint guide disposed therein is coupled to the seat back frame such that the upper cross bracket member at least partially overlaps the seat back frame upper cross portion.

Also provided is a one-piece seat back frame for use in a vehicle seat assembly having a first side portion and a second side portion spaced apart from the first side portion, an upper cross portion and a lower cross portion. A lower cross bracket member is coupled to the seat back frame such that the lower cross bracket member at least partially overlaps the seat back frame lower cross portion forming a boxed section. A first recliner mechanism is coupled to the second end of the lower cross bracket member. A pivot bracket is also coupled to the first side of the lower cross bracket member. The pivot bracket includes a planar plate portion having an opening defined by an inner edge having a plurality of teeth. A tab member having an upper end including a ring portion and a lower end extends outwardly from the plate portion inner edge. A connector having a plurality of teeth is rotatably disposed within the tab member ring portion, such that the plate portion teeth interlock with the connector teeth when the tab member is displaced towards the plate portion inner edge by an impact.

An advantage of the present disclosure is that one-piece seat structure has reduced mass and cost and increased strength. Another advantage of the present disclosure is that the one-piece seat structure is easier to manufacture and assembly. A further advantage of the present disclosure is that the one-piece seat structure can be customized for use with single-sided recliner systems or dual-sided recliner systems. Yet another advantage of the present disclosure is that the one-piece seat structure has fewer weld joints and improved reliability.

Other features and advantages of the present disclosure will be readily appreciated, as the same becomes better understood after reading the subsequent description taken in conjunction with the accompanying drawings.

DESCRIPTION

Figure 1:
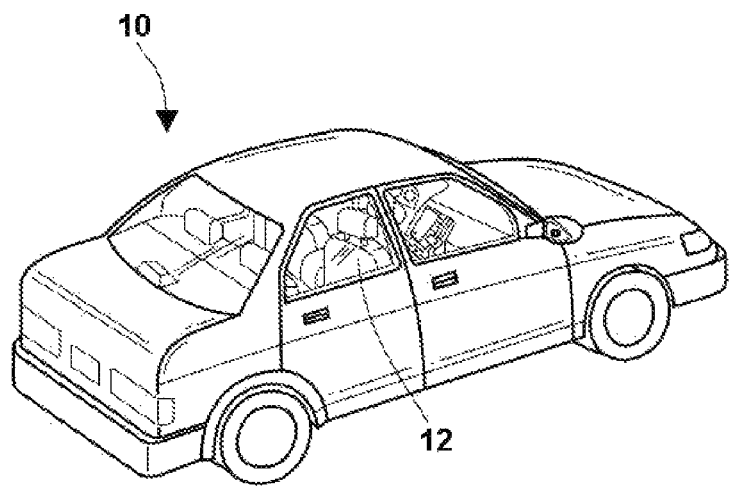
FIG. 1 is a perspective view of a vehicle having vehicle seat assembly, according to an exemplary embodiment.

Referring generally to the FIGURES and particularly to FIG. 1, a vehicle 10 is shown according to an exemplary embodiment. The vehicle 10 can include one or more seat assemblies 12 provided for occupant(s) of the vehicle 10. While the vehicle 10 shown is a four door sedan, it should be understood that the seat assembly 12 may be used in a minivan, sport utility vehicle, airplane, boat, or any other type of vehicle.

Figure 2:
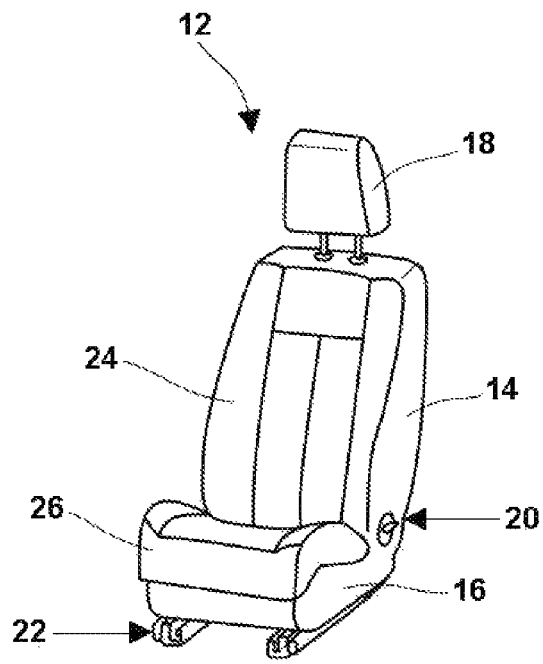
FIG. 2 is a perspective view of a vehicle seat assembly, according to an exemplary embodiment.
Figure 3:
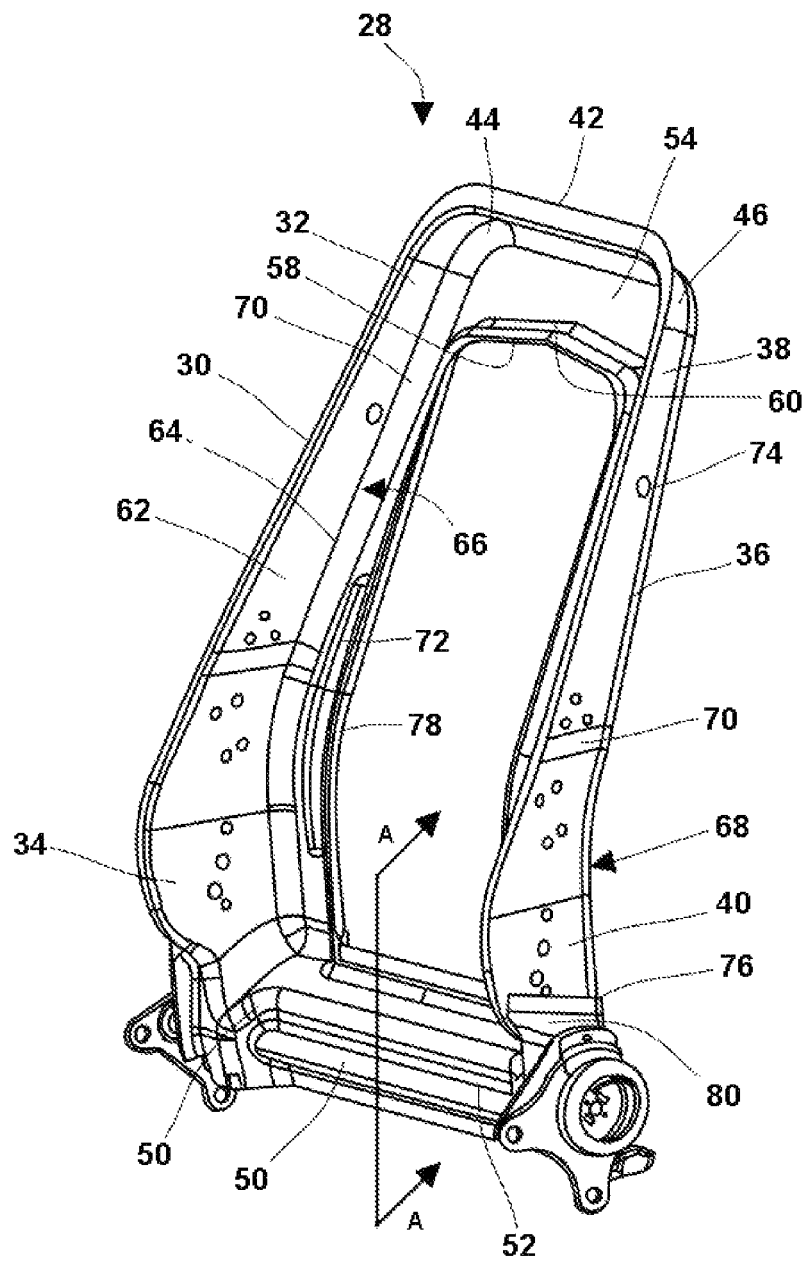
FIG. 3 is a front perspective view of a one-piece seat back frame assembly having a cross bracket member and pivot bracket attached thereto, according to an exemplary embodiment.

Referring now to FIG. 2, a seat assembly 12 is shown. The seat assembly 12 includes a seat back 14 operatively connected to a seat base 16. The seat back 14 and seat base 16 provide comfort, support and protection to the seated occupant. A head restraint 18 is positioned at an upper end of the seat back 14 and also provides comfort, support and protection to the seated occupant. The seat assembly 12 can also include a recliner mechanism 20 having an actuator 21 operatively connected to the seat back 14 and seat base 16, to provide rotatable adjustability of the seat back 14 with respect to the seat base 16. The seat assembly 12 can also be secured to the vehicle 10 using a track assembly 22. In this example, the track assembly 22 enables the seat assembly to be repositioned relative the vehicle floor to enhance comfort and utility. The seat back 14 and seat base 16 can also include other components, such as, a trim cover 24, a seat cushion structure 26, or the like.

Referring to FIGS. 3-11, a one-piece seat back frame assembly 28 for use in a vehicle seat is shown. The one-piece seat back frame assembly 28 can be used with a variety of seat assemblies with or without recliner systems. For example, the one-piece seat back frame assembly can be used with recliner system, such as, a dual or single-sided recliner system, or the like.

The one-piece back frame 28 generally includes a first side member or portion 30 having an upper and lower end 32, 34, an opposed second side member or portion 36 having an upper and lower end 38, 40. The one-piece seat back frame 28 also includes an upper cross member or portion 42 having a first and second end 44, 46 located between the upper end of first side member 32 and the upper end of the opposed second side member 38. An opposed lower cross member or portion 48 having a first and second end 50, 52 is located between the lower end of the first side member 34 and the lower end of the second side member 40. The first side member 30, the second side member 36, the upper cross member 42 and lower cross member 48 form the substantially rectangular one-piece back frame 28, and the seat back frame 28 has a front surface 54 and a rear surface 56. The front and rear surfaces 54, 56 are generally substantially flat but can have a variety of profiles, contours, features, or the like, as needs or performance requirements dictate which are further described below.

The one-piece back frame 28 also includes an inner side wall 58 extending from an inner edge 60 of the front surface 54 and an outer side wall 62 extending from an outer edge 64 of the front surface 54 to form and define a generally U-shaped channel or profile 66. The one-piece back frame 28 can also have a bend or angled portion 68 that is positioned on a portion of the one-piece back frame 28 and that is angled at a predetermined degree. In this example, the bend 68 is located between the upper and the lower cross member 42, 48, respectively. The one-piece back frame 28 (and any of the other one-piece seat back frame assembly components such as the lower cross bracket member, pivot bracket, recliner, or the like) can also include a plurality of surface features or structures 70, such as, rib/stiffeners, beads, darts, protrusions, elevations, depressions, deformations, stampings, or the like) 54 formed as part of or integrally with the back frame 28 to enhance the strength and rigidity performance of the seat back frame 28 without significantly increasing the mass thereof. The number, length, shape, width, dimensions, position, location, orientation, or the like, of the features 70 can vary as appropriate and/or as needed to optimize strength, stability and performance of the one-piece back frame 28. In this example, a vertical rib 72 is disposed on a portion of the first and second side member 30, 36 to enhance the fore/aft stiffness of the one-piece back frame 28. The complexity of these features 70 can vary depending on the type of material used. Generally, the complexity of the geometries can be increased with the use of lower strength material. The one-piece back frame 28 may also include a plurality of openings 74, such as, holes, extruded holes, apertures, grooves, channels, passageways, or the like, and interface/surface areas 76 for attachment of other components, such as, recliner mechanisms, recliner plates, recliner shafts, foam, trim covers, head restraints, or the like. The one-piece back frame 28 may also include a plurality of edges or flanges 78 disposed along or extending from the inner and outer side walls 58, 62 that provide stiffness to the structure, durability for the seat foam/upholstery, reduced sharp edges, and attachment/resting surfaces for other components, such as, foam, trim cover, or the like.

Figure 4:
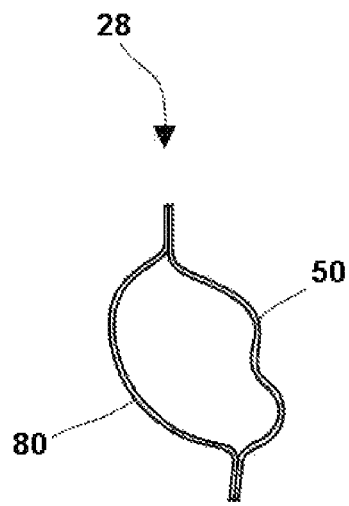
FIG. 4 is cross-sectional view of the one-piece seat back frame assembly of FIG. 3 along the A-A line.
Figure 6:
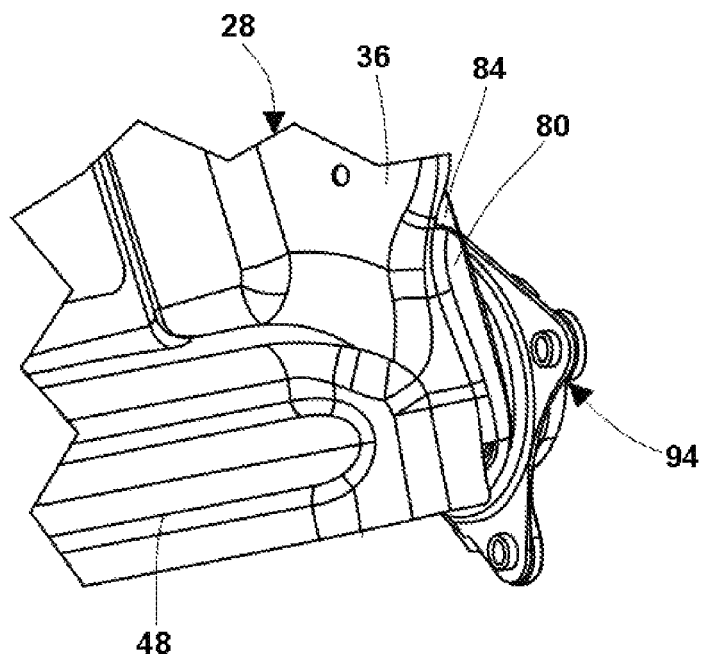
FIG. 6 is an enlarged partial front perspective view of the one-piece seat back frame assembly of FIG. 3.
Figure 5:
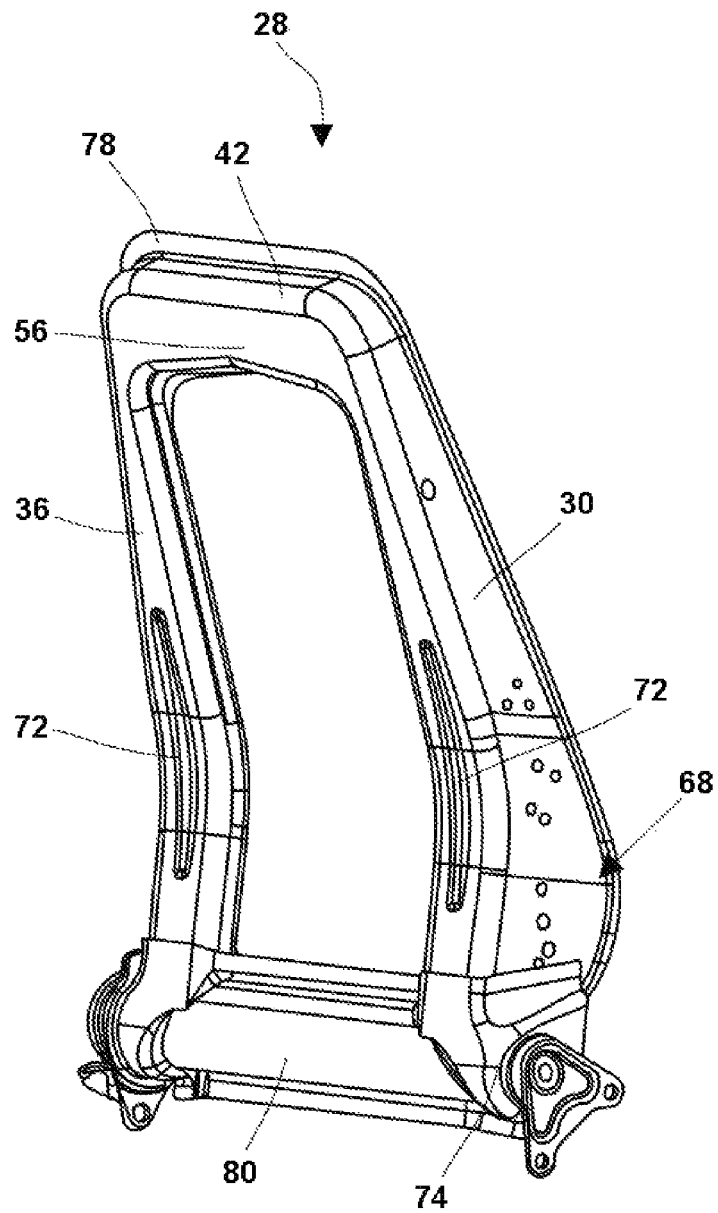
FIG. 5 is a rear perspective view of the one-piece seat back frame assembly of FIG. 3.
Figure 7:
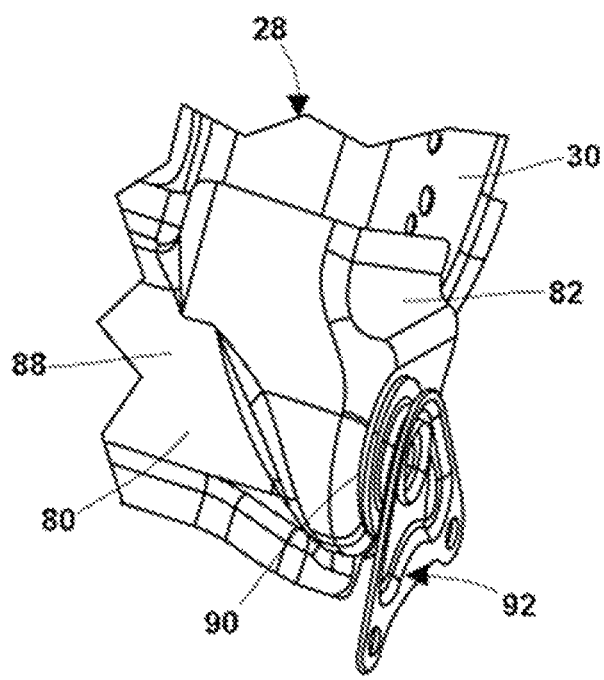
FIG. 7 is an enlarged partial rear perspective view of the one-piece seat back frame assembly of FIG. 3.
Figure 8:
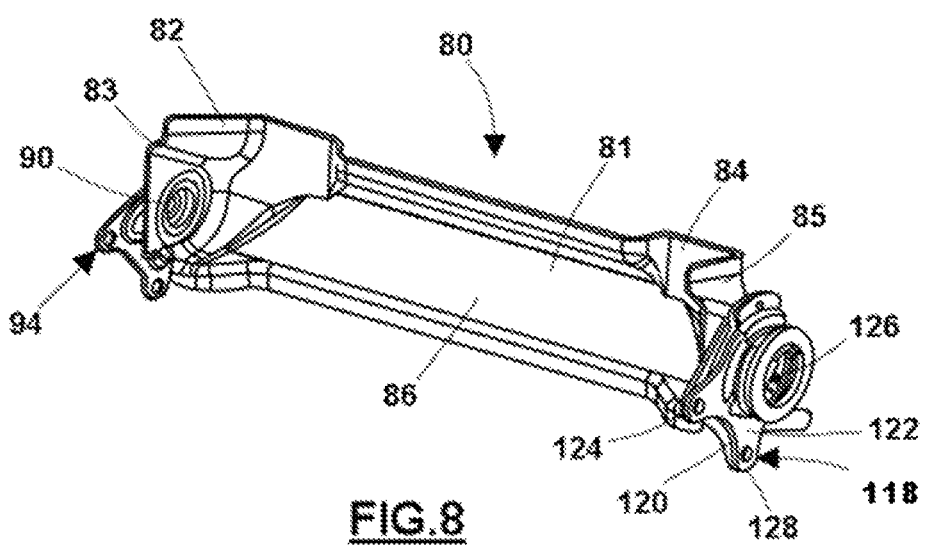
FIG. 8 is a perspective view of a cross bracket member having a pivot bracket and seat back pivot bracket attached thereto, according to an exemplary embodiment.
Figure 9:
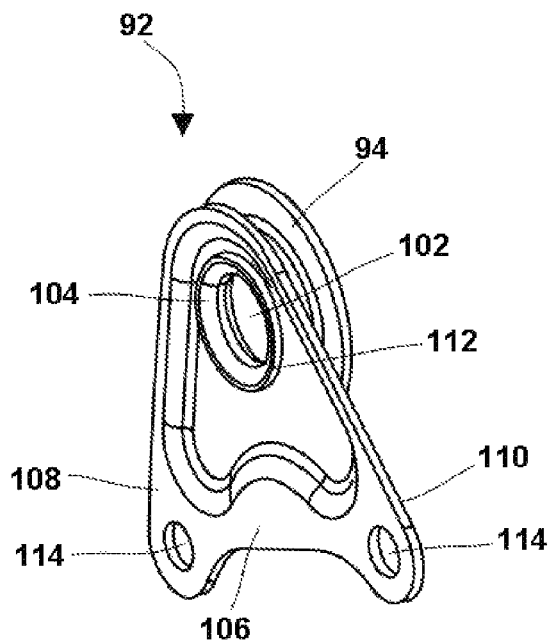
FIG. 9 is a perspective view of a pivot bracket, according to an exemplary embodiment.
Figure 10:
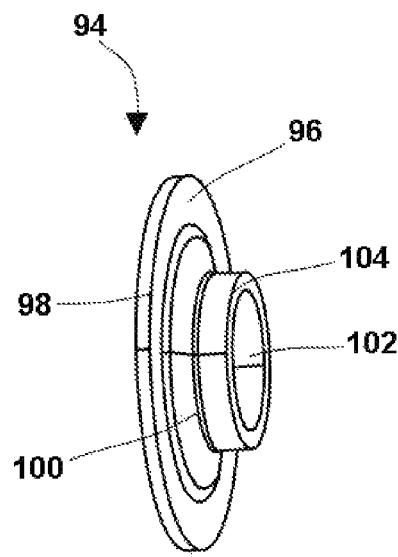
FIG. 10 is a perspective view of a ring member, according to an exemplary embodiment.
Figure 11:
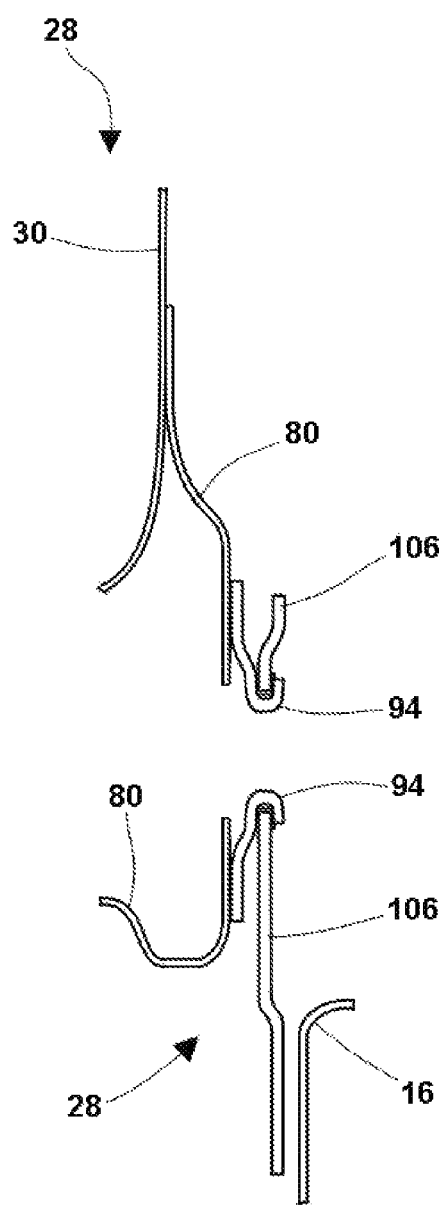
FIG. 11 is a cross-sectional view of a cross bracket member coupled to a one-piece seat back frame and seat base frame, according to an exemplary embodiment.

The one-piece back frame assembly 28 can also include a cross bracket member 80 having attachment/surface areas for mounting components or structures thereto, such as, recliners, pivot brackets, or the like, as shown in FIG. 8. The cross bracket member 80 may serve as a brace or reinforcement for the one-piece back frame assembly 28. The cross bracket member 80 includes a generally planar body portion 81 having a first end 82 and an opposed second end 84. The body portion includes a front surface 86 and a rear surface 88. A first wall 83 extends outwardly from the body portion first end and an opposed second wall 85 extends outwardly from the body portion second end 84. The cross bracket member 80 is coupled to the rear side of the lower cross member portion 48 to create a box-like structural section, as shown in FIG. 4. The box-like structural section enhances torsional integrity and compression strength of the seat assembly 12. It also reinforces the lower portion of the one-piece seat back frame 48 from forces, such as, side impact loads, or the like, as shown in FIGS. 3-7. The cross bracket member 80 may have higher torsional and lateral compression strength than other types of members used in a seat structure, such as, cross tubes, torsion tubes, or the like. The cross bracket member 80 may have a contour corresponding to the shape of the one-piece seat back frame 28, such as, the lower cross member 48, to facilitate coupling between the two components and create a tight and snug fit. The cross bracket member 80 can also include a plurality of openings 90, such as, holes, apertures, slots, or the like, to couple other components thereto, such as, a pivot bracket 92, a recliner 118, or the like.

The one piece seat back frame may also include a pivot bracket 92 secured to at one or both ends of the cross bracket member 80 to enable the seat back to pivot relative to the seat base. The pivot bracket 92 includes a connector 94, such as, a ring member, bushing, or the like. The connector 94 includes a ring portion 96 having an outer diameter or edge 98 and an inner diameter or edge 100 that form an opening 102. The connector 94 also includes a substantially cylindrical wall or hollow collar portion 104 extending from the inner diameter 100. The connector 94 also includes a plate member 106, such as a base plate, or the like. The plate member 106 is a substantially planar member having a first surface 108, a second surface 110, a primary opening 112, such as, a hole, aperture, or socket, or the like, and a plurality of secondary openings or holes 114 for attachment to other seat structures, and/or components. The plate member 106 can also include a variety of structural features 116, such as, contours, shapes, extensions, attachment areas, or the like, to enhance the strength, rigidity and performance of the plate member 106 and to facilitate attachment to other structures. The ring member 94 (collar portion) is rotatably coupled to the socket 112 of the planar member 106 thereby creating a socket joint such that the ring member 94 rolls over the edge of the extruded socket hole 112 and can also include a bushing to enhance functionality.

The one piece seat back frame may also include a recliner coupled to one or both ends of the cross bracket member 80 to enable selective adjustment of the seat back relative to the seat base. The recliner 118 includes a plate member 120, such as a base plate, or the like. The plate member 120 is a substantially planar member having a first surface 122, a second surface 124, a primary opening 126, such as, a hole, aperture, or socket, or the like, and a plurality of secondary openings or holes 128 for attachment to other seat structures, and/or components. The plate member 1120 can also include a variety of structural features 130, such as, contours, shapes, extensions, attachment areas, or the like, to enhance the strength, rigidity and performance of the plate member 120 and to facilitate attachment to other structures.

The pivot bracket 92 and recliner 118 can be coupled to the first and second end 82, 84, such as the inboard and outboard sides, of the cross bracket member 80, as shown in FIG. 8. The planar member of the pivot bracket 106 and/or the recliner 120 is rotatably coupled to another seat structure, such as the seat base frame, or the like, via the apertures of the planar members 114, 128. The pivot bracket 94 and recliner 118 and their components thereof can have a variety of shapes, sizes, dimensions, such as a flared extrusion, or the like. In this example, the plate member 106, 120 is a substantially triangular member.

The one-piece seat structure can be formed from various materials, such as, tailor welded blanks, tailor welded coils, monolithic blanks or coils having uniform or non-uniform material grade and thickness, or the like. The one-piece seat structures can be formed from a variety of steel grades and types, such as, HSLA, AHSS (Dual Phase, Complex Phase, TRIP, post form heat treatable steel, such as, aluminum, magnesium, or the like). The materials used can be optimized depending on various factors, such as, the type of structure or portion to be made, the location of the structure or portion, the geometry requirements of the structure or portion, the strength requirements of the structure or portion, or the like. For example, lower strength materials typically have higher formability which enable incorporation of more (or higher complexity) geometry in the design of a structure or portion, but may require greater thickness to recover strength lost by using lower strength material. The formability and strength of the material can be optimized and balanced according to the needs dictated by the type of structure or portion and its location within the seat assembly.

In one example, the one-piece seat back frame 28 can be constructed from a tailor welded blank using various cold forming processes as disclosed in International Application No. PCT/US09/61027 filed Oct. 16, 2009 and PCT/US10/43391 filed Jul. 27, 2010 which are incorporated by reference herein in their entirety. Generally, the tailored welded blank can be formed to provide the ability to, for example, integrate components, minimize scrap, reduce handling, reduce cost and optimize strength and mass. For example, mass and cost can be optimized by flexibly optimizing the material, that is, mechanical properties and thickness at differing sections of a tailored welded blank to meet requirements of strength and manufacturing. The tailored welded blank can then be formed through a cold-forming process to produce a one-piece structural component, which may have complex geometry yet require fewer secondary operations and less expensive fixtures or tooling. The one-piece seat back frame 28 can be optimized for cost and mass, which meets or exceeds strength and durability requirements and the strength and durability of conventional seat structures. Also, this optimization of mass can allow for construction of a smaller seat, which in turn can provide increased space within the vehicle for cargo or comfort. The mass reduction of seat components can have a ripple effect for vehicle manufacturers, as mass reduction affects the design of other components, such as, brakes, powertrain, or the like, and can allow for other components that are lower mass, smaller, more efficient, or the like, which can lead to other cost savings in the vehicle.

Figure 12:
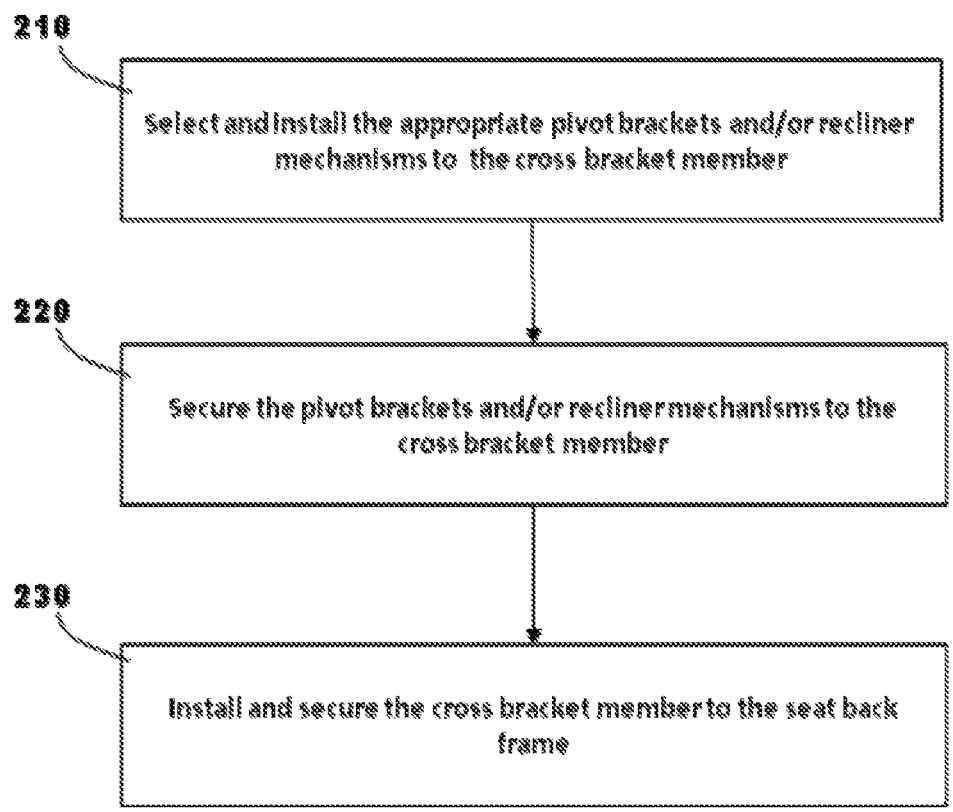
FIG. 12 is a flow chart of a method of manufacturing/assembling a one-piece seat back frame, according to an exemplary embodiment.

Once the one-piece seat back frame is formed, the one-piece seat back frame assembly is then assembled together using a predetermined method. In an example, manufacturing or assembling the one-piece seat back frame assembly 28 can be completed in an exemplary methodology, as shown in FIG. 12.

The methodology begins at the first step at 210. In this step the appropriate brackets and/or recliner mechanisms are selected, such as, the pivot brackets 92 and/or recliner mechanisms 118 and are installed on the cross bracket member 80. For example, the ring portion of the pivot bracket connector 94 is coupled to or disposed into the opening or hole 92 on the first end 82 and/or second end 84 of the cross bracket member 80. The cross bracket member 80 can be customized for either a one-sided recliner seat application or a dual-sided recliner seat application. For a single-sided recliner seat application a pivot bracket 92 is installed on one side of the cross bracket member 80 and a recliner mechanism is installed on the opposing side of the cross bracket member 80. For a dual-sided recliner seat application a recliner mechanism is installed on each side of the cross bracket member 80.

The methodology proceeds to the second step at 220. In this step the brackets and/or recliners are secured to the cross bracket member using a selected technique, such as, welding, fastening, or the like.

The methodology next proceeds to the third step at 230. In this step the cross bracket member 80 with installed brackets and/or recliners is installed in the seat back frame and secured thereto using a selected technique, such as, welding, fastening, or the like.

The one-piece seat back frame assembly 28 of the present disclosure provides a number of benefits. For example, the cross bracket member 80 portion of the one-piece seat back frame assembly 28 improves the overall structure by providing a box-like structural section that enhances torsional integrity and compression strength of the seat assembly 12, thereby requiring only one recliner. The one-piece seat back frame assembly 28 provides higher cost and mass efficiency than other seat back frame structures. The one-piece seat back frame assembly 28 can also be configured as a left hand side seat assembly or a right hand side seat assembly and thereby eliminating the need to construct opposite seat components. The gage of material used to form the cross bracket member 80 (box stamping) can be increased without significant impact to the assembly in terms of cost, mass, or the like. The design of the cross bracket member 80 also enables easier mounting of other structures (e.g., recliner mountings, pivot brackets, etc.) and provides a relatively large surface area (planar surface/front face) to more efficiently distribute loads and retain occupants in the seat during impact. The flared extrusion of the planar member 106, 134 enables loads to be distributed into the stamping (seat structure/pivot assembly) and provides a relatively large surface area for a joint (e.g., joint between ring member and planar member, etc.) thereby further reducing manufacturing costs and part count requirements.

Figure 13:
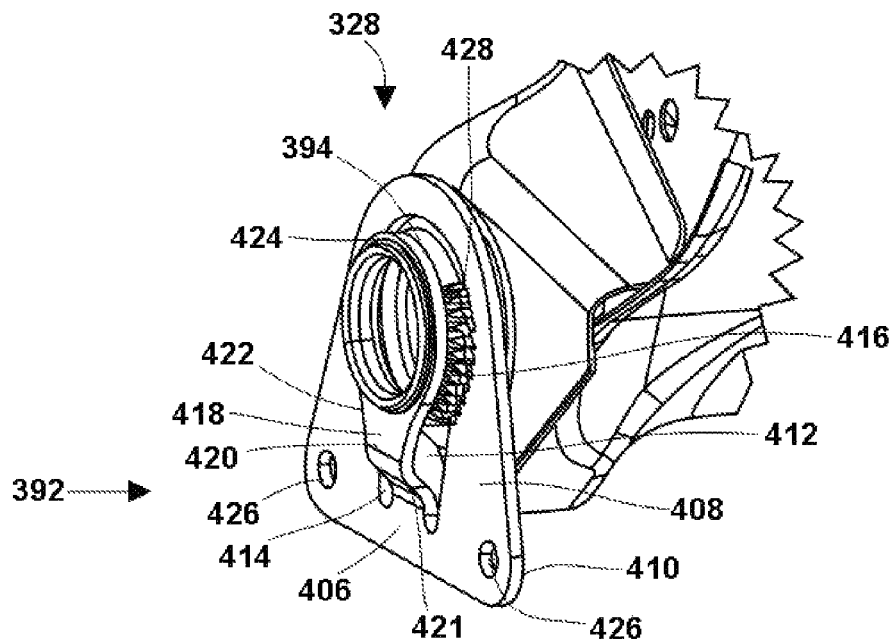
FIG. 13 is front perspective view of a pivot bracket having a plurality of interlocking teeth, according to an another embodiment.
Figure 14:
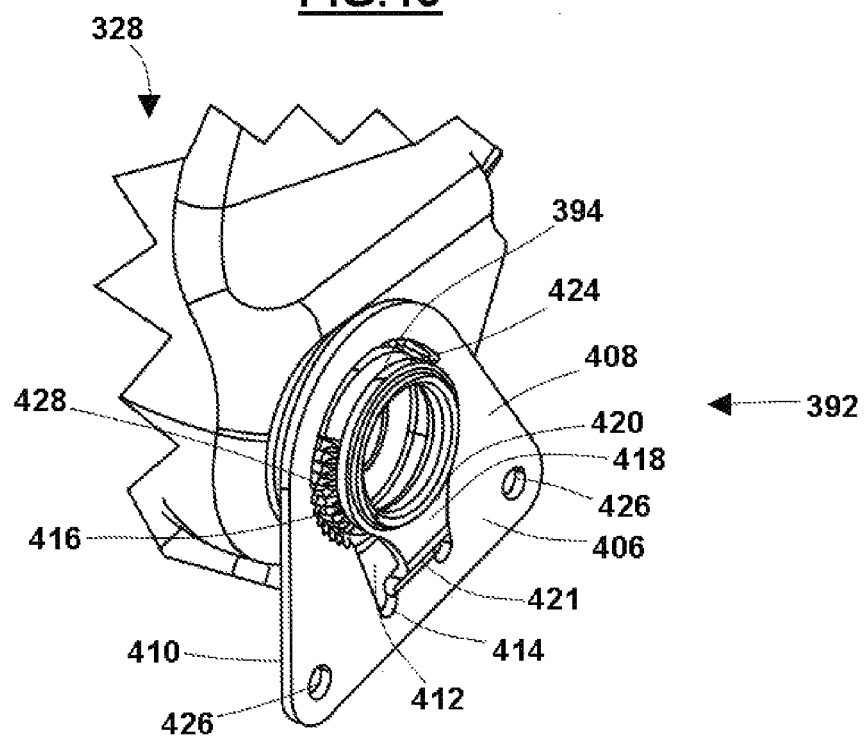
FIG. 14 is a rear perspective view of the pivot bracket having of FIG. 13.

Referring now to FIGS. 13-14, a seat assembly 328 according to yet another embodiment is shown. In this embodiment, the pivot bracket 392 includes a ring member connector 394 and a plate member 406, such as a base plate, or the like. The pivot bracket 328 may be coupled to the first or second side (inboard and outboard sides) of the cross bracket member 380.

The plate member 406 is a substantially planar member having a first surface 408, a second surface 410 and a central opening 412 having an inner edge 414. At least a portion of the inner edge 414 includes a plurality of teeth 416 for engagement with the ring member connector 394 to be described in further detail below. The plate member 406 also includes a tab member 418 extending outwardly from the central opening inner edge 414. The tab member 418 has a lower portion 420 including a series of section bends 421 and an upper portion 422 having an opening 424, such as, an extruded socket hole, or the like. In this example, the upper portion 422 is in the shape of a ring for attachment to the ring member connector 394. The plate member 406 also includes a plurality of secondary openings or holes 426 for attachment to other seat structures, and/or components. The plate member 406 may also include a variety of additional structural features, such as, contours, shapes, extensions, bends, ribs, corrugations, attachment areas, or the like, to enhance the strength, rigidity and performance of the plate member 406 and to facilitate attachment to other structures. The planar member 406 may be coupled to another seat structure, such as, a seat base frame, or the like, via the apertures 426. The planar member 406 can have a variety of shapes, sizes, dimensions, such as a flared extrusion.

The ring member 394 is coupled to the tab member opening 424 such that the ring member 394 rolls over the edge of the of the tab member opening 424 and may also include a bushing to enhance functionality. In this embodiment, the ring member connector 394 also includes a plurality of interlocking teeth 428 for engaging/interlocking with the plate member teeth 416. The interlocking teeth of the ring member connector 428 and the plate member teeth 416 may be angled in a predetermined manner (such as, forward, rearward, or the like) to facilitate engagement and locking. Alternatively, the teeth may be located on the tab member ring portion.

The section bends 421 provide structural integrity that constrains the pivot bracket 392 under normal loading and enables the pivot bracket 392 to be displaced under impact loading. For example, upon a rear impact the ring member connector 394 and tab member 418 are displaced rearward towards the inner edge of the plate member 414 thereby causing the ring member teeth 428 to engage/interlock with the plate member teeth 416. This provides a mechanism for preventing rotation of the seat back upon vehicle impact.

Figure 15:
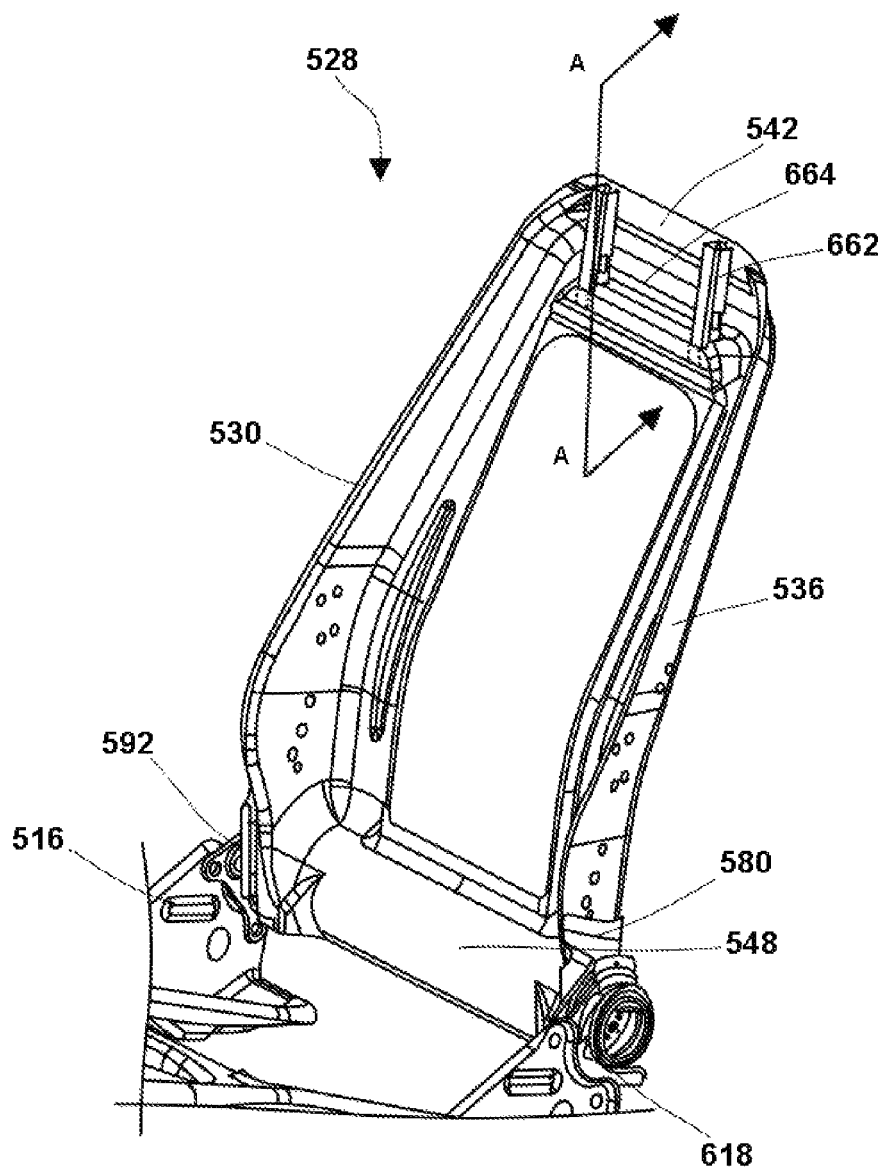
FIG. 15 is a partial perspective view of a one-piece seat back frame assembly having a cross bracket member, a head restraint attachment feature and coupled to a seat base frame, according to yet another embodiment.
Figure 16:
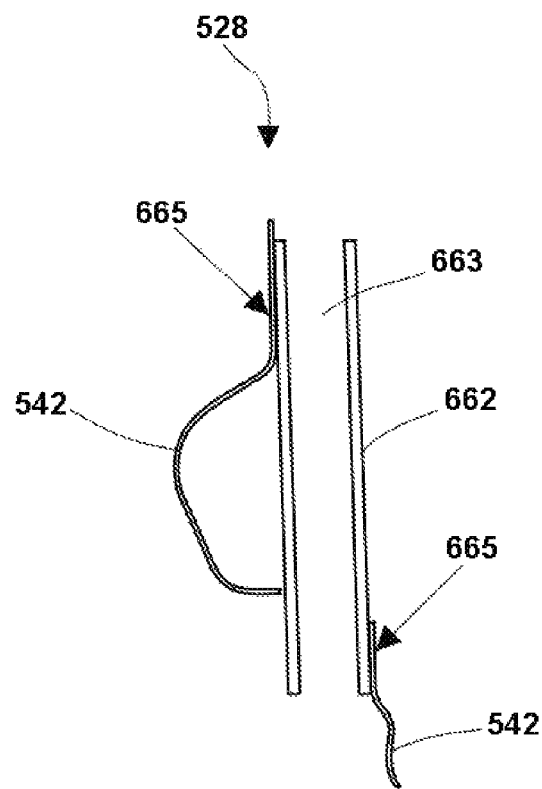
FIG. 16 is a cross-sectional view of the one-piece seat back frame assembly of FIG. 15 along the A-A line.
Figure 17:
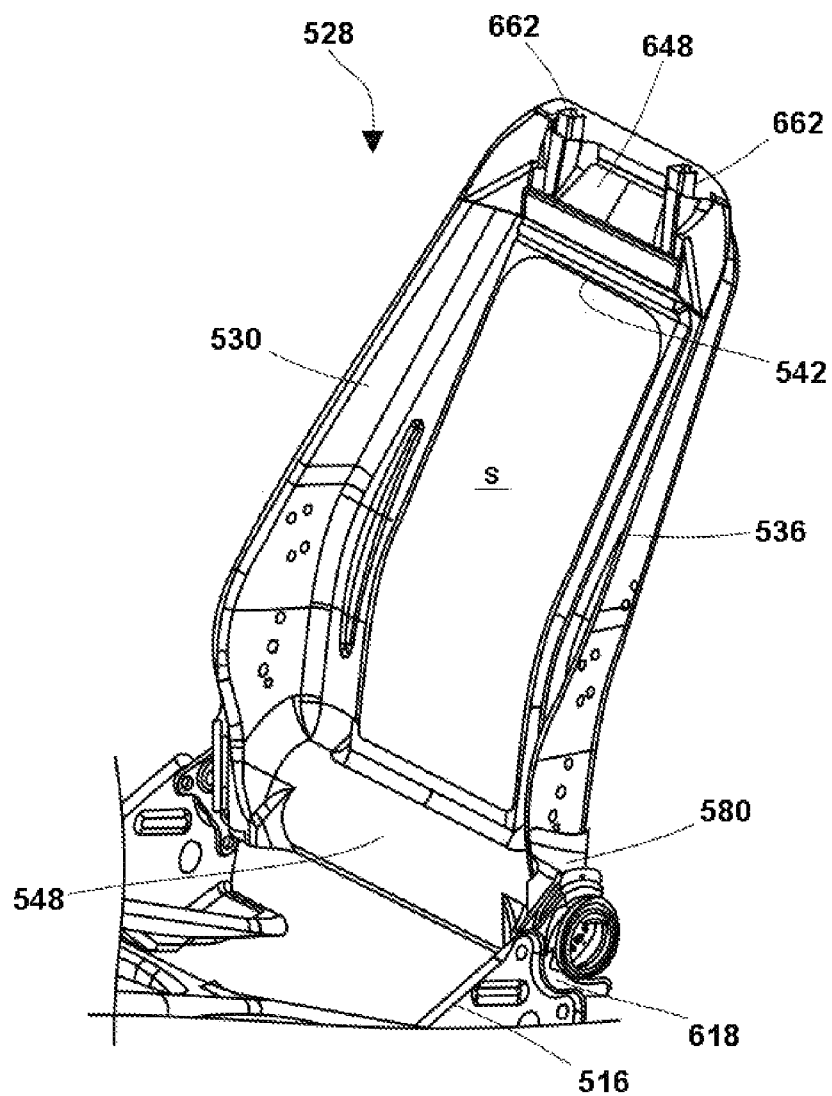
FIG. 17 is a perspective view of the one-piece seat back frame assembly of FIG. 15 having an upper reinforcement brace coupled to the upper cross member.
Figure 18:
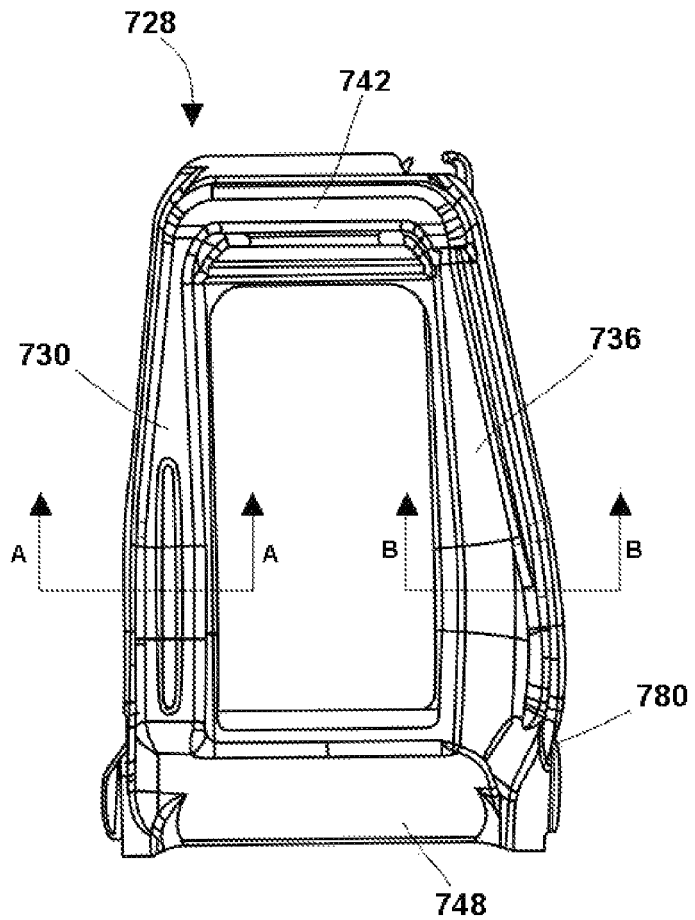
FIG. 18 is a one-piece seat back frame assembly having a cross bracket member attached thereto, according to yet another embodiment
Figure 19:
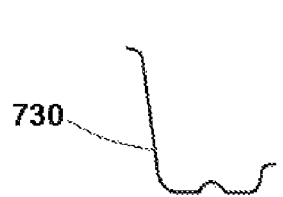
FIG. 19 is a cross-sectional view of the one-piece seat back frame assembly of FIG. 18 along the A-A line.

Referring now to FIGS. 15-17, a one-piece seat back frame assembly 528 according to yet another embodiment is shown. In this embodiment, the one-piece seat back frame 528 includes an upper-cross bracket member 648. The upper cross bracket member includes a first end 650 and an opposed second end 652 that generally forms a elongated member having a first side or surface 654 and an opposed second side or surface 656. The upper cross bracket member 648 may also include an opening and a guide member for a head restraint. In this example, the upper cross bracket member includes a first and a second aperture or passage 658, 660 having a first and a second guide member 662 disposed therein. The guide members can be a variety of structures, such as, shafts, tubes, or the like. The guide members are disposed within the passages and used for coupling other structures to the seat back, such as, a head restraint, or the like. In this example, the guide member 662 has a tubular channel 663 that is designed to receive the shafts or rods of a head restraint. The upper cross-bracket member 648 is positioned onto the first and second guide members 662 such that the upper cross member 648 lays adjacent or against the upper cross member portion 542 thereby reinforcing the upper cross member portion 542 of the one-piece seat back frame 528. To reduce costs and scrap material and improve manufacturing efficiency, the upper cross bracket 648 and/or the lower cross bracket 580 (along with other seat components) can be formed from excess or scrap material produced from forming the one-piece seat back frame, such as, the offal or center scrap portion of the back frame (S), or the like. The upper cross member portion 542 of the one-piece seat back frame 528 can also include a plurality of features, such as, sections, or the like, designed to prevent a moment in the clockwise direction caused by the head restraint upon a rear impact. In one example, the upper cross member includes a first and second slot for vertical insertion of the guide member therein. The upper cross member 542 also includes slip planes 665 which enable movement of the guides/head restraint in the vertical (up and down) directions.

Figure 20:
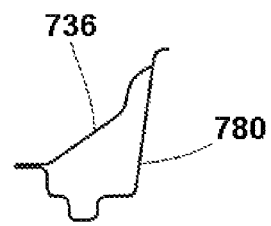
FIG. 20 is a cross-sectional view of the one-piece seat back frame assembly of FIG. 18 along the B-B line.
Figure 21:
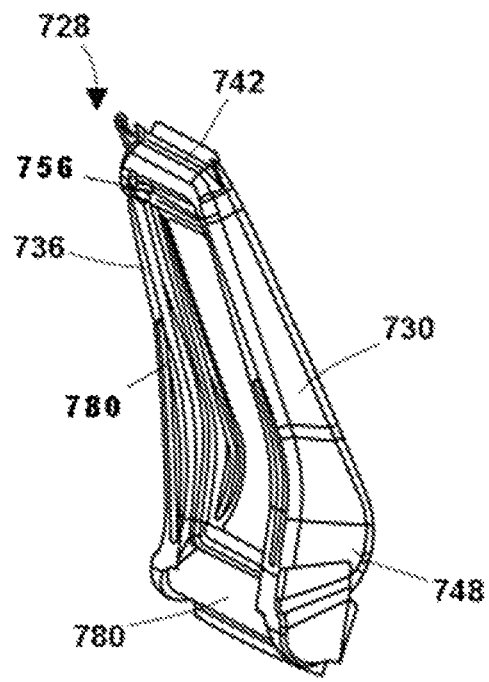
FIG. 21 is a rear perspective view of the one-piece seat back frame assembly of FIG. 18.

Referring now to FIGS. 18-21 a one-piece seat back frame assembly 728 according to yet another embodiment is shown. In this embodiment, the one-piece back frame 728 generally includes a first side member or portion 730 and an opposed second side member or portion 736. The one-piece seat back frame 28 also includes an upper cross member or portion 742 located between the first side member 730 and the second side member 736. An opposed lower cross member or portion 748 is located between the first side member 730 and the second side member 736. The first side member 730, the second side member 736, the upper cross member 742 and lower cross member 748 form the substantially rectangular one-piece back frame 728 having a front surface 754 and a rear surface 756. The one-piece seat back frame 728 also includes a cross bracket member 780 coupled to the rear surface of the seat back frame 756 on the lower cross member portion 748 to create torsional integrity and reinforce the lower portion of the one-piece seat back frame 748 from forces, such as, side impact loads, or the like. The cross bracket member 780 may also extend a predetermined distance up the seat back 728 towards the upper cross member 742. For example, the cross bracket member 780 may extend partially or completely up one or a combination of the first side member 730, the second side member 736, the upper cross member 742, or the lower cross member 748. One or more cross bracket members 780 may also partially or completely span the space between the first side member 730, the second side member 736, the upper cross member 748, or the lower cross member 742 in a predetermined design, pattern, or manner. In this example, the cross bracket member 780 extends up the second side member 736 creating an integrated structural seat (ISS) having a boxed-like section, as shown in FIG. 20, which further enhances seat performance, strength, or the like.

While the innovation of the present disclosure has been described with respect to the one-piece seat back frame described, it is contemplated that other types of seat back frames may also be used with the present innovation, such as, a standard multi-piece seat back frame, tube frame, other one-piece seat back frame designs, or the like.

Figure 22:
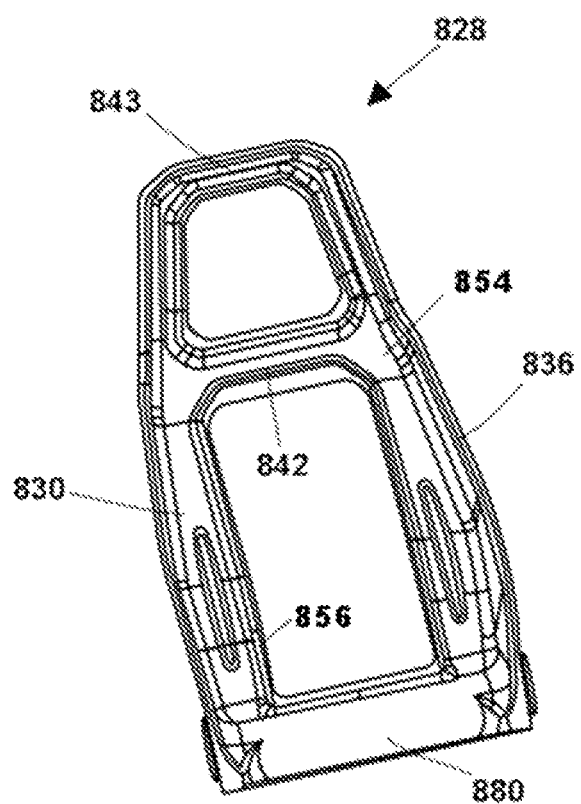
FIG. 22 is a front perspective view of a one-piece seat back frame having an integrated head restraint according to yet another embodiment.

For example, a one-piece seat back frame, as shown in FIG. 22, could also be used. In this example, the one-piece seat back frame 828 generally includes a first side member or portion 830 and an opposed second side member or portion 836. The one-piece seat back frame 828 also includes an upper cross member or portion 842 located between the first side member 830 and the second side member 836. An opposed lower cross member or portion 848 is located between the first side member 830 and the second side member 836. The one-piece seat back frame 828 also includes a head restraint frame 843 formed integrally with the upper portion of the one-piece back frame 842. The first side member 830, the second side member 836, the upper cross member 842, lower cross member 848 and head restraint frame 843 form the substantially rectangular one-piece back frame 828 having a front surface 854 and a rear surface 856.

Many modifications and variations of the present disclosure are possible in light of the above teachings. Therefore, within the scope of the appended claim, the present disclosure may be practiced other than as specifically described.

What is claimed is:

1. A one-piece seat back frame assembly for use in a vehicle seat, the one-piece seat back frame assembly comprising:
   a one-piece seat back frame having:
   a. a first side portion and a second side portion spaced apart from the first side portion, the first side portion having an upper end and a lower end and the second side portion having an upper end and a lower end;
   b. an upper cross portion having a first end and an opposed second end, wherein the upper cross portion first end is formed to the first side portion upper end and the second end is formed to the second side portion upper end;
   c. a lower cross portion having a first end and an opposed second end, the lower cross portion first end formed to the first side portion lower end and the second end formed to the second side portion lower end;
   a lower cross bracket member having an elongated body portion having a first end, an opposed second end, a front surface, an opposed rear surface, a first wall extending outwardly from the body portion first end, and an opposed second wall extending outwardly from the body portion second end, wherein the lower cross bracket member is coupled to the seat back frame such that the lower cross bracket member at least partially overlaps the seat back frame lower cross portion forming a boxed section; and
   a first recliner mechanism coupled to the second end of the lower cross bracket member.

2. The one-piece seat back frame of claim 1, further comprising a second recliner mechanism coupled to the first end of the lower cross bracket member for a dual-sided recliner system.

3. The one-piece seat back frame assembly of claim 1, further comprising a pivot bracket coupled to the first side of the lower cross bracket member wherein the pivot bracket includes a planar plate portion having an opening and a connector rotatably disposed within the opening.

4. The one-piece seat back frame assembly of claim 3, wherein the connector includes a ring portion having an outer edge and an inner edge that define a hole and a cylindrical wall extending from the inner edge.

5. The one-piece seat back frame assembly of claim 4, wherein the planar plate portion opening is an extruded hole having an edge and the connector is rotatably disposed therein to create a socket joint such that the connector rolls over the plate hole edge.

6. The one-piece seat back frame assembly of claim 1, wherein the lower cross bracket member extends upwards beyond the seat back frame lower cross portion and at least partially up the seat back frame second side portion forming a boxed section.

7. A one-piece seat back frame assembly for use in a vehicle seat, the one-piece seat back frame assembly comprising:
a one-piece seat back frame having:
a. a first side portion and a second side portion spaced apart from the first side portion, the first side portion having an upper end and a lower end and the second side portion having an upper end and a lower end;
b. an upper cross portion having a first end, an opposed second end and a first channel having a first head restraint guide disposed therein, wherein the upper cross portion first end is formed to the first side portion upper end and the second end is formed to the second side portion upper end;
c. a lower cross portion having a first end and an opposed second end, the lower cross portion first end formed to the first side portion lower end and the second end formed to the second side portion lower end; and
a upper cross bracket member having an elongated body portion having a first end, an opposed second end, a front surface, an opposed rear surface, wherein the upper cross bracket member is coupled to the seat back frame such that the upper cross bracket member at least partially overlaps the seat back frame upper cross portion.

8. The one-piece seat back frame assembly of claim 7, wherein the upper cross portion includes a second channel having a second head restraint guide disposed therein.

9. The one-piece seat back frame assembly of claim 7, further comprising a lower cross bracket member having an elongated body portion having a first end, an opposed second end, a front surface, an opposed rear surface, a first wall extending outwardly from the body portion first end, and an opposed second wall extending outwardly from the body portion second end, wherein the lower cross bracket member is coupled to the seat back frame such that the lower cross bracket member at least partially overlaps the seat back frame lower cross portion forming a boxed section; and a first recliner mechanism coupled to the second end of the lower cross bracket member for a single-sided recliner system.

10. The one-piece seat back frame assembly of claim 7, further comprising a second recliner mechanism coupled to the first end of the lower cross bracket member for a dual-sided recliner system.

11. The one-piece seat back frame assembly of claim 7, further comprising a pivot bracket coupled to the first side of the lower cross bracket member wherein the pivot bracket includes a planar plate portion having an opening and a connector rotatably disposed within the opening.

12. The one-piece seat back frame assembly of claim 11, wherein the connector includes a ring portion having an outer edge and an inner edge that define a hole and a cylindrical wall extending from the inner edge.

13. The one-piece seat back frame assembly of claim 12, wherein the planar plate portion opening is an extruded hole having an edge and the connector is rotatably disposed therein to create a socket joint such that the connector rolls over the plate hole edge.

14. A one-piece seat back frame assembly for use in a vehicle seat, the one-piece seat back frame assembly comprising:
a one-piece seat back frame having:
a. a first side portion and a second side portion spaced apart from the first side portion, the first side portion having an upper end and a lower end and the second side portion having an upper end and a lower end;
b. an upper cross portion having a first end and an opposed second end, wherein the upper cross portion first end is formed to the first side portion upper end and the second end is formed to the second side portion upper end;
c. a lower cross portion having a first end and an opposed second end, the lower cross portion first end formed to the first side portion lower end and the second end formed to the second side portion lower end;
a lower cross bracket member having an elongated body portion having a first end, an opposed second end, a front surface, an opposed rear surface, a first wall extending outwardly from the body portion first end, and an opposed second wall extending outwardly from the body portion second end, wherein the lower cross bracket member is coupled to the seat back frame such that the lower cross bracket member at least partially overlaps the seat back frame lower cross portion forming a boxed section;
a first recliner mechanism coupled to the second end of the lower cross bracket member; and
a pivot bracket coupled to the first side of the lower cross bracket member, wherein the pivot bracket includes a planar plate portion having an opening defined by an inner edge having a plurality of teeth, a tab member having an upper end including a ring portion and a lower end extending outwardly from the plate portion inner edge, and a connector having a plurality of teeth and rotatably disposed within the tab member ring portion, such that the plate portion teeth interlock with the connector teeth when the tab member is displaced towards the plate portion inner edge upon an impact.

15. The one-piece seat back frame assembly of claim 14, wherein the tab member lower end includes a plurality of section bends that provide structural integrity and constrain the pivot bracket under normal loading conditions and enables the pivot bracket to be displaced under impact loading conditions.

16. A method of manufacturing a one-piece seat back frame assembly, the method comprising the steps of:
providing a seat back frame having a first side portion and a second side portion spaced apart from the first side portion, the first side portion having an upper end and a lower end and the second side portion having an upper end and a lower end and a cross bracket member having an elongated body portion having a first end, an opposed second end, a front surface, an opposed rear surface, a first wall extending outwardly from the body portion first end, and an opposed second wall extending outwardly from the body portion second end;
selecting appropriate pivot brackets and recliner mechanisms to be installed onto the cross bracket member;
installing and securing the pivot brackets and recliner mechanisms onto the cross bracket member; and
installing and securing the cross bracket member to the seat back frame wherein the lower cross bracket member is coupled to the seat back frame such that the cross bracket member at least partially overlaps a seat back frame lower cross portion forming a boxed section.

\* \* \* \* \*